May 4, 1965  S. R. ALLEN ETAL  3,181,822
"WHEELS-UP" FLARE WARNING SYSTEM
Filed Nov. 13, 1963  3 Sheets-Sheet 1
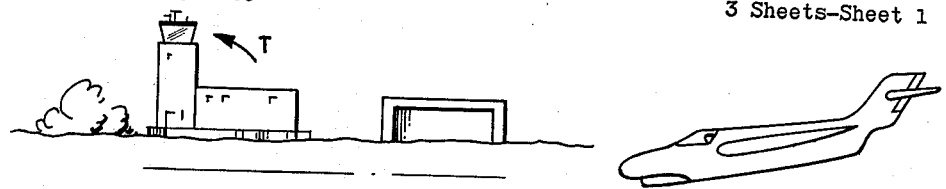
FIG. 1.
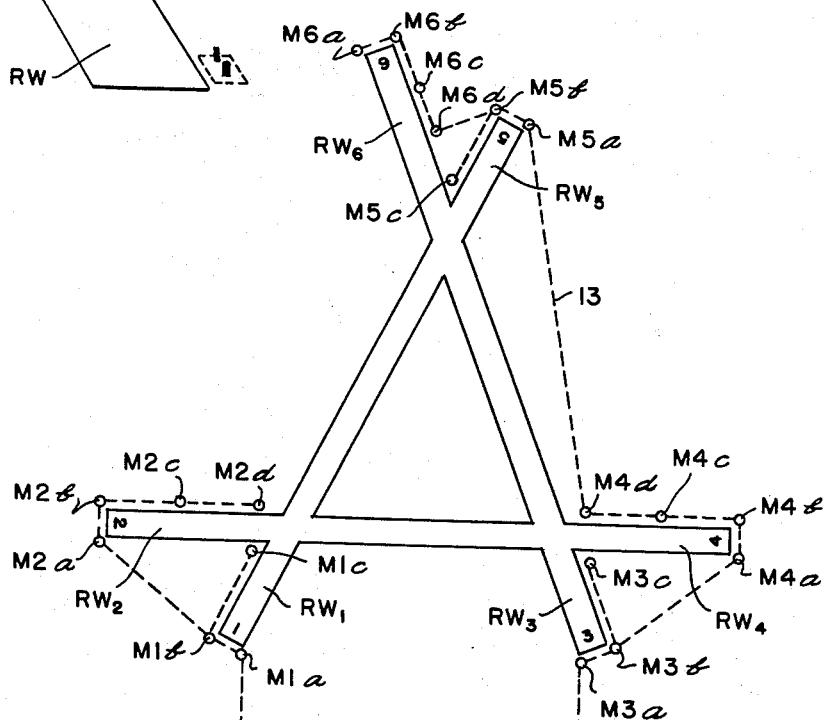
FIG. 2.
INVENTORS.
SANFORD RUSSELL ALLEN
KENNETH R. FOOTE
BY
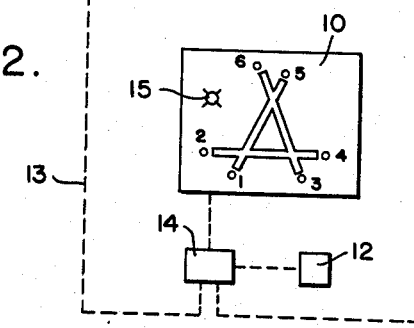
ATTORNEY.

INVENTORS.
SANFORD RUSSELL ALLEN
KENNETH R. FOOTE
BY
ATTORNEY.

United States Patent Office 3,181,822
Patented May 4, 1965

3,181,822
"WHEELS-UP" FLARE WARNING SYSTEM
Sanford Russell Allen and Kenneth R. Foote, China Lake, Calif., assignors to the United States of America as represented by the Secretary of the Navy
Filed Nov. 13, 1963, Ser. No. 323,512
5 Claims. (Cl. 244—114)
(Granted under Title 35, U.S. Code (1952), sec. 266)

The invention described herein may be manufactured and used by or for the Government of the United States of America for governmental purposes without the payment of any royalties thereon or therefor.

This invention relates to signaling systems and more particularly to an emergency pyrotechnic signaling system, including flare firing devices, for advising an airborne aircraft pilot of prevailing conditions as the pilot makes his landing approach at an airfield.

Those concerned with aircraft recovery operations, particularly those at military airfields, have long been aware of an ever-present possibility of "wheels-up" landings wherein a landing is negotiated while the aircraft's wheels are in a retracted, or partially retracted, condition. The consequences of "wheels-up" landings are numerous, and oftentimes disastrous to both personnel and property.

In an attempt to obviate "wheels-up" landings, modern aircraft are customarily provided with various types of indicators which serve to warn a pilot that the aircraft's wheels are not "down-and-locked" so that he may make needed corrections before attempting a final landing. Furthermore, radio communication is normally utilized during landing operations, by both control tower personnel and pilots, to advise tower personnel and pilots of landing aircraft that abnormal wheel conditions prevail. Despite these precautions, "wheels-up" landings still occur, due in part to indicator malfunction and/or a loss of aircraft to control tower communication.

A continued occurrence of "wheels-up" landings has resulted in "wheel-watch" personnel being stationed near the approach end of airfield runways for visually observing an approaching aircraft's wheel disposition and for initiating procedures to warn the pilot when the aircraft's wheels are not "down-and-locked." These procedures ordinarily include the waving, or manipulation, of "paddles," the firing of hand held Very pistols, and the flashing of lights. However, it has been found that "wheel-watch" personnel are particularly susceptible to certain psychological impacts and/or mental stresses which tend to reduce efficiency to the point that a failure to initiate timely warning procedures often occur in the presence of emergency conditions. Hence, "wheels-up" landings continue to occur, even though all the aforedescribed techniques are normally practiced as a matter of routine procedure.

Therefore, it is the general purpose of this invention to provide a simple warning system which may be readily installed at existing airfields to be operated by experienced tower personnel, particularly in instances where "wheel-watch" personnel fail to take appropriate action when an incoming aircraft approaches a runway with its wheels in a "wheels-up" condition.

An object of the instant invention is to provide an aircraft warning system which may be controlled from remotely displaced control points.

Another object is to provide a "wheels-up" flare warning system which may be operated from an airfield control tower to fire a plurality of pyrotechnic warning flares along a single selected runway as pilot warning for aircraft approaching the runway with its wheels in a partially, or fully, retracted condition.

A further object is to provide a simplified, dependable, and economic pyrotechnic signaling device, which may be remotely controlled for instantaneously discharging a pyrotechnic warning flare or flares along an optimum trajectory.

Other objects, advantages and novel features of the invention will become apparent from the following detailed description of the invention when considered in conjunction with the accompanying drawings wherein:

FIG. 1 comprises a schematic view of an airfield, not to scale, illustrating a tower controlled, simultaneous firing of a plurality of pyrotechnic flares from mortars arranged along certain runways as provided at a selected airfield;

FIG. 2 is a one-line diagrammatic view illustrating a mortar firing circuit and an arrangement of mortar positions relative to various runways of the airfield of FIG. 1;

Figure 3:
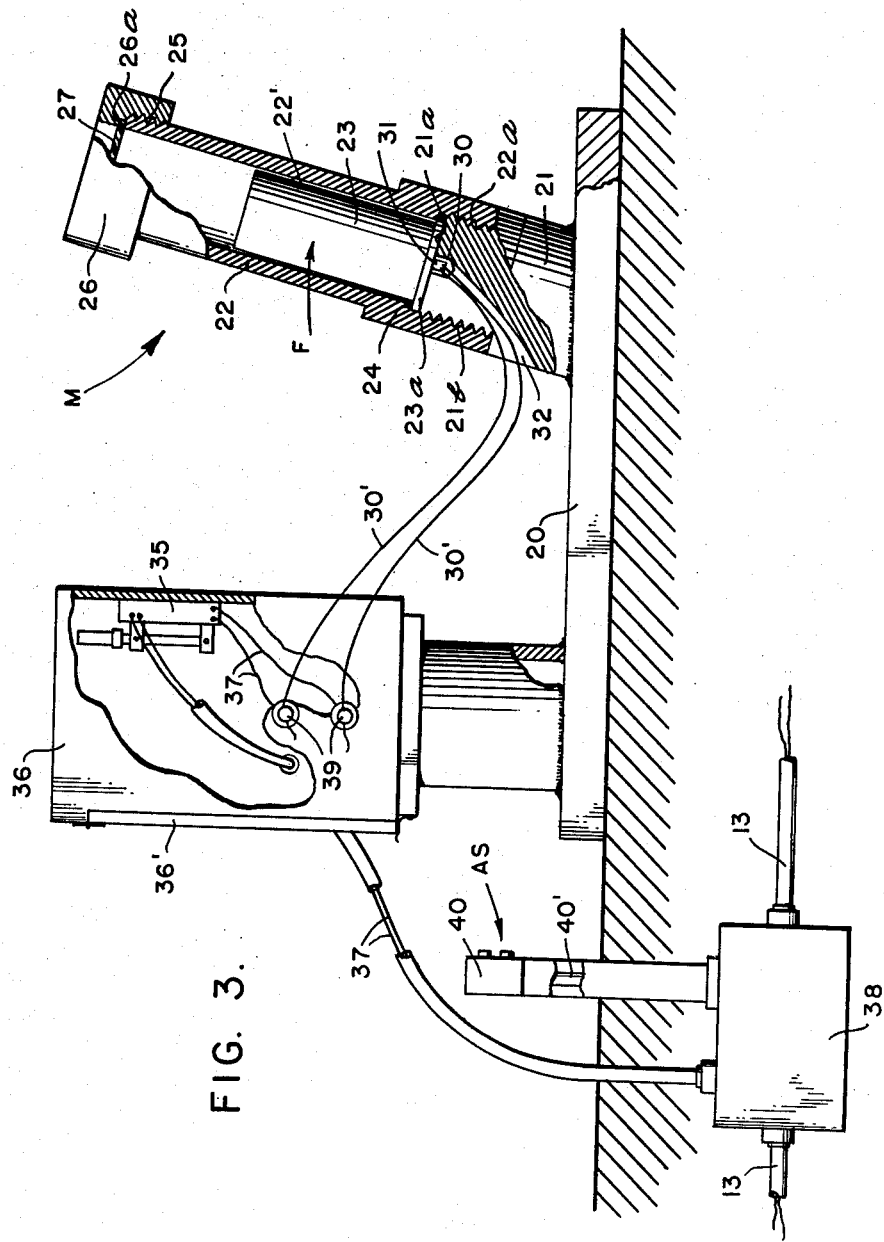
FIG. 3 is a side elevational view, partly in section, of a loaded and armed flare mortar and its associated safety switch.

Referring to the drawings, more specifically, there is shown in FIG. 1 a plurality of mortar implacements P arranged along runways, generally designated RW, of a given airfield. Each of the implacements P is provided with a mortar, generally designated M. The mortars M are so interconnected as to accommodate a simultaneous firing thereof along selected runways by personnel stationed in a control tower T, or by a "wheel-watch" stationed at the approach end of a selected one of the runways.

Turning now to FIG. 2, the mortars generally designated M in FIG. 1, are specifically designated M1a–M6d in order to specifically designate particular mortars and groups thereof. The runways, generally designated RW, FIG. 1, are specifically designated $RW_1$–$RW_6$ for purposes of designating specific runways about which groups of mortars are situated. As diagrammatically illustrated by the one-line diagram of FIG. 2, the mortars M1a–M6d are arranged in a spaced relationship of varying distances, normally about 1000 feet along each side of the runways $RW_1$–$RW_6$ and across the ends thereof. All of the mortars M are interconnected through a simple mortar circuit, as will hereinafter be more fully described, so that they may be selectively and simultaneously activated, or fired, from a remote common control point.

For establishing a control point common to all of the mortars M, there is arranged within the airfield's control tower T, a control panel 10 presenting on its face an air field replica with each of the runways $RW_1$–$RW_6$ being miniaturized and orientated to duplicate those of the associated airfield, when observed by tower personnel.

Adjacent each of the miniaturized runways, the panel is provided with a plurality of spring biased circuit closing firing buttons designated 1–6, being so numbered as to correspond with runway designations for aiding tower personnel in a selection thereof when the mortars M are to be fired along a particular runway.

Figure 4:
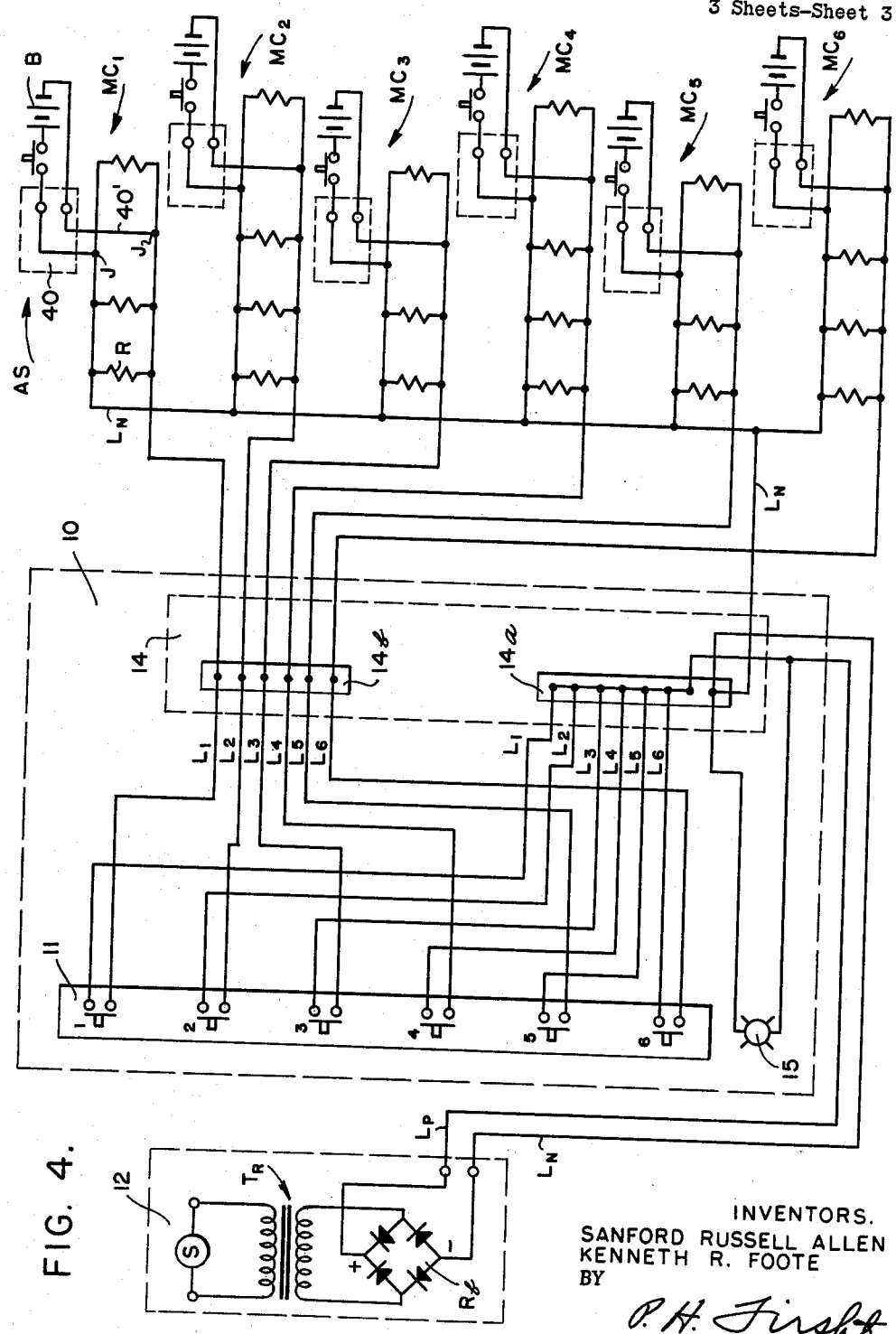
FIG. 4 is a functional diagrammatic view of the circuitry illustrated by the one-line diagram of FIG. 2.

Ordinarily, the panel 10 is so disposed as to be connected in the mortar circuit whereby the firing buttons may serve to close normally open circuit firing switches 11, FIG. 4. The switches, upon closing, serve to complete portions of the mortar circuit between any suitable voltage source 12 and particular groups of mortars for causing warning flares to be fired from the mortars. The source 12 may comprise a suitable full-wave D.-C. (direct current) rectifier, hereinafter more fully described, functioning to provide the mortar circuit with an electrical current of sufficient amperage to initiate a firing of the mortars M1a–M6d. Since each airfield, as well as landing aircraft, inherently possess a significant electric field thereabout, it is desirable that the mortars M be fired by an electrical current having an amperage value greater than 1.5 amperes to obviate an accidental firing of the mortars under the influence of the electric fields present about the airfield and possessed by landing aircraft. Therefore, it is deemed advisable that the source 12 be capable of providing a D.-C. output voltage sufficient to deliver more than 2.0 amperes through each of the hereinafter described flare detonating devices normally arranged within each of the specifically designated mortars M1a–M6d.

While various arrangements may be provided for connecting the mortar circuit associated mortars M with the panel 10, as a practical matter, a buried electrical conduit, not shown, may be utilized to direct a multi-wire cable 13 from the panel 10 to the mortars M1a–M6d. As a matter of convenience, the cable 13 may be connected with the panel 10 through a suitable terminal block cabinet 14. Further, as a precautionary measure, there is arranged on the face of the panel 10 an indicator light 15 so connected across the source 12 so as to be continuously illuminated as long as a source output voltage is being applied to the mortar circuit from the power source 12. Hence, failure of the light 15 functions as a warning means to advise tower personnel that the mortar circuit is "dead," viz., no power is being supplied to the mortar circuit from the source.

The mortars M1a–M6d are of similar design and construction, therefore, description of a single one of the mortars M is deemed sufficient to provide an understanding of the present invention. Each of the mortars M comprises means, FIG. 3, which eject a pyrotechnic device, or flare, generally designated F, of a type commonly utilized in conventional Very pistols. The pyrotechnic device is ordinarily contained in a standard military cartridge and is of a type heretofore normally detonated, or fired, by a mechanically operated firing pin striking a detonator contained within the base of the cartridge.

A flat base plate 20 serves to mount each of the mortars M and is normally horizontally arranged in a seated disposition at an implacement P. On the uppermost surface of the base plate 20 there is fixed an upwardly extended, elongated mortar base 21. The mortar base 21 is fixed to the base plate 20 through any suitable means, however, such means must be capable of withstanding forces of recoil as flares are fired from the mortar. The uppermost end of the mortar base 21 terminates in a flat face 21a and is provided with an externally threaded portion 21b. A mortar barrel 22, having an internally threaded coupling 22a formed at one end thereof, is removably coupled with the base 21 by threading the coupling 22a with the threaded portion of the mortar base 21.

The barrel 22 comprises an elongated tubular member normally mounted in co-axial alignment with the motor base 21, and is provided with an internal diameter, near one end thereof, sufficient to provide a cartridge chamber 22', whereby a flare cartridge 23 may be internally received within the barrel and held with its base extending toward the internally threaded coupling 22a. Where desired, the internal dimensions of the barrel may be uniform throughout the barrel's length, as illustrated in the drawing. In order for a conventional flare cartridge 23 to be received and maintained within the barrel 22, a shoulder 24 is formed within and near one end of the barrel 22 and functions to secure the cartridge rim 23a of the flare cartridge 23 so as to maintain the base of the cartridge adjacent the face 21a of the mortar base 21. Therefore, it is to be understood that when a mortar M is loaded, a cartridge 23 is secured within the cartridge chamber 22' of the barrel 22 with its base arranged adjacent the flat face 21a of the mortar base 21.

At the uppermost end of the barrel 22, there is provided an externally arranged threaded portion 25 which mates in coupling fashion with a threaded portion of an internally threaded open-center cover retaining cap 26. The cap 26 is provided with an opening therein coextensive with the barrel's opening at its flare discharge end, and further, includes a cover retention shoulder 26a for positioning and retaining a frangible plastic cover disk 27. The disk 27 is normally retained across the opening of flare discharge end of the barrel 22 to form a seal for sealing the interior of the barrel form environmental hazards.

While the uppermost, or flange discharge, end of the barrel 22 may be directed in any suitable direction, it has been found through experiment that on optimum direction exists at an elevation of 75 degrees in a direction parallel with, and along the flight path of incoming aircraft, viz. away from the end of adjacent runways.

A cartridge detonator, for each flare cartridge, is normally provided and retained within the cartridge at its base. This detonator may be activated through a detonation of an explosive primer 30 seated in a machined fulminating hole 31 disposed near the center of the uppermost face 21a of the motor base 21. The fulminating hole 31 communicates with a cartridge base, adjacent the cartridge's detonator, so that as the primer 30 is detonated, forces of concussion act on the cartridge detonator and serve to cause an activation thereof. The primer 30 is of a commercially available, electrically detonated type, which is capable of generating sufficient force, on being detonated, to cause the cartridge's detonator to become activated.

As hereinbefore mentioned, the primer 30 is of a type which is to be electrically detonated. Therefore, it is necessary to provide means for electrically connecting each primer 30 with the mortar circuit so that a closing of a selected switch 11, through a pressing of a selected one of the firing buttons, serves to detonate the primers of mortars positioned along selected runways. To afford such connection, each primer 30 is normally provided with a pair of lead wires, or primer wires, 30' connected with the mortar circuit and attached to the primer 30 in such a manner that an electrical current may pass from the mortar circuit through the primers.

As a practical matter, in order to accommodate the wires 30', it is necessary that the mortar base 21 be provided with a passageway for establishing a communication between the exterior surfaces of the mortar base 21 and the fulminating hole 31. A primer wire passageway 32 may be formed in the mortar base 21 by drilling through the base to the fulminating hole, or, as preferred, by milling a radially extending kerf diagonally through the mortar base to terminate at the fulminating hole and at a point below the threaded portion 21b of the mortar base 21.

The primer wires 30' may be connected to the mortar circuit through any suitable circuit connecting means so that a circuit may be completed through the primer 30', however, since the mortars are to be hand-loaded after each firing, it is desirable to include a primer safety switch 35, disposed between the primer of each mortar and the mortar circuit. The switch 35 may be housed in a conventional housing or access box 36. The box 36 is normally provided with a door 36' for affording convenient access to the switch 35. The switch 35 may comprise a normally closed conventional single-throw, double-pole switch, which, when opened, serves to open a connecting circuit, including the primer wires 30' and a pair of mortar circuit leads 37. The mortar circuit may be connected with the connecting circuit at a junction box 38 disposed in the earth adjacent each mortar implacement P, and connected to the cable 13.

The hereinbefore mentioned cable 13 extends to each box 38 so that each pair of connecting leads 37, for each mortar, may be connected across the mortar circuit and be extended from the junction box 38 through a safety switch 35 to a pair of binding posts 39. Each pair of posts 39 are normally mounted on the housing or box 36 and are of any suitable design, such as a conventional stud-and-nut connector, for example. The posts 39 function as connecting means for connecting the primer leads 30' with the connecting circuit leads 37.

In practice, it is oftentimes desirable to utilize heretofore mentioned "wheel-watch" personnel for activating the mortars. Therefore, where desired, a portable power source, such as a battery B, FIG. 4, may be connected across the mortar circuit at an auxiliary control station, generally designated AS, through a mortar circuit connected junction box 40. Hence, it is possible for "wheel-watch" personnel to detonate flare cartridges, or activate the mortars, along a given runway RW, merely by closing a switch to apply voltage from an auxiliary power source across the mortar circuit.

The mortar circuit is more clearly illustrated in the functional diagram of FIG. 4. In practice, the D.-C. voltage source 12 comprises a simple phase full-wave rectifier $R_b$ illustrated as a metallic rectifier, coupled with an A.-C. (alternating current) source S through a conventional transformer $T_R$. The rectifier $R_b$ provides and output voltage through a single lead $L_P$ to a terminal block 14a disposed in the terminal block cabinet 14. From the block 14a extend suitable leads L1–L6 having therein the aforementioned normally open switches 11. The switches 11 are arranged so that when a selected one of the buttons is pressed, a circuit is completed through a selected one of the leads L1–L6, through a plurality of primers 30, and back to the rectifier $R_b$ through a lead $L_N$. The terminal block 14b, also disposed within the terminal block cabinet 14, primarily functions as a convenient means for connecting the panel 10 with the mortar circuit, and therefore, may be eliminated where desired. It is to be understood that the indicator light 15 may be connected with the source 12 in any suitable manner, such as, for example, by connecting its electrical leads across leads $L_P$ and $L_N$, whereby a voltage may be continuously applied across the light's terminals.

Each primer 30 of the mortars M is connected to the mortar circuit in a manner as hereinbefore described. However, the mortars are, in practice, arranged in groups to be fired, or actuated, as individual groups with each group being associated with a preselected one of the runways $RW_1$–$RW_6$. Hence, it is to be understood that each group is to be fired through a closing of a single one of the switches 11. Therefore, it is necessary to divide the mortar circuit into a plurality of grouping circuits $MC_1$–$MC_6$ for grouping the primers 30, shown as loads R in FIG. 4, into groups and connecting them in circuit parallel.

Referring again to FIG. 2, it is to be understood that the mortars may be grouped as groups having therein, specifically, mortars M1a–M1c, M2a–M2d, M3a–M3c, . . ., and M6a–M6d. These groups are arranged about and along runways $RW_1$, $RW_2$, $RW_3$, . . ., and $RW_6$, respectively, so that when a firing button, for example, firing button 1 corresponding to runway $RW_1$, is pressed, a circuit is completed only through all of the loads R, or primers 30, FIG. 4, connected with the grouping circuit $MC_1$ disposed within the groups of mortars comprising mortars M1a–M1c, whereby all mortars of this group may be fired simultaneously to warn a pilot of an aircraft about to land on runway $RW_1$, while the remaining mortars reside in an inactivated state. Hence, each of the parallel grouping circuits, designated $MC_1$–$MC_6$, is connected in cricuit series with the source 12 and a given one of the switches 11 through a given one of the leads L1–L6 and the lead $L_N$.

Where an auxiliary firing station AS is to be provided, auxiliary leads 40' extend from the junction box 40 to connect the battery B, through a switched batter circuit, across an associated grouping circuit at junction terminals J.

As a practical matter, it has been found that it is not necessary to provide a voltage input of a magnitude normally required for firing all mortars simultaneously, since, ordinarily, it is necessary that only one of the grouping circuits be energized at any given time. Further, a detonation of a primer 30 serves to open a circuit, or remove a load R. Therefore, it is not ordinarily necessary for the input voltage to be of a value necessary for firing all of the mortars of a single group simultaneously. As each of the loads R inherently serve as a voltage divider for causing unequal currents to flow in the grouping circuits, it will be understood that the loads R may be removed in sequence to effect a sequential activation of the mortars of a selected group. To exemplify, assume that the grouping circuit $MC_1$ is energized by closing a grouping circuit associated switch 11, it is necessary to supply sufficient amperage through the first ocurring load R, or primer 30, of mortar M1a. As the primer 30 of mortar M1a is detonated, the load is removed so that an additional current will flow through the load R, or primer 30, of mortar M1b, causing it to detonate, thus removing another load R, whereupon additional current is now caused to flow through the final primer 30 of mortar M1c for initiating a detonation thereof. Since the mortars are normally arranged at least one thousand feed apart along the runways, this operational characteristic becomes particularly important from an economic standpoint.

It is to be further understood that while a single mortar is normally positioned at a given implacement P, it may be deemed desirable to electrically connect a second mortar to the mortar grouping circuit at the implacement and provide a conventional time delay mechanism therefor, so that two flares may be fired at predetermined time intervals from a single implacement P upon a single energization of the grouping circuit.

Operation of the hereinbefore described system may be summarized as follows: Each mortar M is hand-loaded after first removing the barrel 22 from the mortar base 21, after the safety switch 35 has been opened. A flare cartridge 23 is now inserted into the chamber 22' and a frangible disk 27 secured over the discharge end of the barrel 22, whereupon, the barrel 22 again threaded onto the motar base 21, after a primer 30 has been inserted in the fulminating hole 31, to thus complete a hand-loading operation. The primer wires 30' are now connected to the binding posts 39 and the switch 35 again closed to thus arm the mortar. Assuming that all the mortars have been loaded and armed, and the light 15 indicates that power is being supplied to the mortar circuit, tower personnel observing a dangerous condition on a given runway RW may now press a selected button for the given runway to close a switch 11 for thereby completing a circuit to a predetermined one of the mortar grouping circuits $MC_1$–$MC_6$. When the switch 11 is closed, all of the primers 30 connected therewith are detonated, substantially simultaneously, for thereby causing a detonation of the detonators of flare cartridges 23 for thereby causing a discharge of a plurality of flares through the frangible cover disks 27. The flares may now be observed by a pilot of an incoming aircraft so that appropriate steps and procedures may be taken.

If "wheel-watch" personnel are utilized, a firing of the mortars may be initiated by a closing of an auxiliary power circuit at an auxiliary control station AS for thus applying a voltage from an auxiliary source across the selected mortar grouping circuit to initiate an activation of a plurality of mortars along the associated runway.

Obviously many modifications and variations of the present invention are possible in the light of the above teachings. It is therefore to be understood that within the scope of the appended claims the invention may be practiced otherwise than as specifically described.

What is claimed is:

1. A pyrotechnic signaling system for an airfield having a control tower and a plurality of designated runways for recovering piloted aircraft, comprising:
    a control tower situated control panel having on its face an airfield replica including a miniaturized runway layout corresponding in detail to the disposition of the runways of an associated airfield;

a plurality of electrically actuated flare firing mortars having an electrically actuated means associated therewith and singularly disposed in juxtaposed relationship with preselected portions of the runways of said airfield;

a plurality of parallel circuits electrically connecting preselected groups of said actuating means in circuit parallel;

a voltage source;

a plurality of voltage source connecting means singularly connecting said parallel circuits in circuit series with said voltage source through said control panel; and a plurality of panel-mounted, normally open firing switches singularly connected in circuit series between each parallel circuit and said voltage source and arranged within said voltage source connecting means for maintaining an open-circuit condition within each of the voltage source connecting means, whereby a closing of a selected firing switch serves to electrically connect a preselected group of electrical actuating means for a preselected group of mortars with the voltage source, for thereby initiating an electrical actuation of the mortars.

2. The system defined in claim 1, wherein each of said mortars comprises:

a horizontally disposed base plate;

an elongated mortar base secured to said plate in a generally vertical disposition;

a mortar barrel secured to said mortar base and coaxially aligned therewith;

means defining a flare cartridge retaining chamber within said barrel adjacent said mortar;

means affording access to said chamber so that a flare cartridge may be inserted into said chamber;

means defining a flare cartridge detonator receiving means arranged in said mortar base for receiving and retaining an electrically actuated flare cartridge detonator;

detonator connecting means electrically connecting a detonator retained in said detonator receiving means with said circuit connecting means; and means defining a normally closed safety switch interposed in said detonator connecting means, whereby said electrically operated detonator may be rendered inert by an opening thereof.

3. The system as defined in claim 2, further characterized in that said mortar barrel is disposed at a 75 degree angle with respect to said mortar base plate.

4. The system as defined in claim 1, further comprising:

a plurality of normally closed and selectively operable safety switches, singularly interconnected in circuit series adjacent each electrically connected mortar actuating means, adapted to be manually operated for singularly disconnecting each of said mortar actuating means from said voltage source.

5. The system according to claim 4, further including:

auxiliary connecting means for electrically connecting an auxiliary voltage source to at least one of said groups of said mortars so that said group of mortars may be actuated from a point remote from said panel.

References Cited by the Examiner
UNITED STATES PATENTS

| | | | |
|---|---|---|---|
| 1,937,219 | 11/33 | Driggs | 89—1.5 |
| 2,368,018 | 1/45 | Groth et al. | 89—1 |
| 2,530,084 | 11/50 | Schermuly et al. | 102—37.4 |
| 2,751,582 | 6/56 | Kuykendall | 102—37.8 X |

FOREIGN PATENTS

| | | |
|---|---|---|
| 570,319 | 7/45 | Great Britain. |

BENJAMIN A. BORCHELT, *Primary Examiner.*

SAMUEL W. ENGLE, *Examiner.*